(12) United States Patent
Holt

(10) Patent No.: US 6,634,721 B2
(45) Date of Patent: Oct. 21, 2003

(54) TRAILER LOCKING DEVICE

(76) Inventor: John P. Holt, 10487 N. Doheny Dr., Fresno, CA (US) 93720

( * ) Notice: Subject to any disclaimer, the term of this patent is extended or adjusted under 35 U.S.C. 154(b) by 0 days.

(21) Appl. No.: 09/872,512

(22) Filed: Jun. 1, 2001

(65) Prior Publication Data

US 2001/0050509 A1 Dec. 13, 2001

Related U.S. Application Data

(60) Provisional application No. 60/208,744, filed on Jun. 2, 2000.

(51) Int. Cl.[7] ............................................. B60T 17/16
(52) U.S. Cl. ........................................ 303/89; 188/353
(58) Field of Search .......................... 303/89, 7, 9, 13, 303/DIG. 3, DIG. 4; 188/3 H, 3 R, 265, 353; 180/287

(56) References Cited

U.S. PATENT DOCUMENTS

| | | | |
|---|---|---|---|
| 3,973,805 A | | 8/1976 | Stevenson et al. |
| 4,258,819 A | | 3/1981 | Baptiste, Sr. |
| 4,621,874 A | | 11/1986 | Gustafsson |
| 4,793,661 A | | 12/1988 | Munro |
| 4,951,776 A | * | 8/1990 | Jeter .......................... 180/287 |
| 5,145,240 A | | 9/1992 | Harless et al. |
| 5,378,929 A | * | 1/1995 | Mor et al. .................. 188/353 |

OTHER PUBLICATIONS

PCT Notification of Transmittal of the International Search Report or the Declaration and International Search Report for International Application No. PCT/US01/17761, dated Sep. 11, 2001 (copies of patents not previously identified set forth in PTO/SB/08A).
PCT Written Opinion for International Application No. PCT/US01/17761, dated May 30, 2002.
Response/Amendment filed by Applicant with regard to International Application No. PCT/US01/17761, dated Jun. 27, 2002.

* cited by examiner

Primary Examiner—Pam Rodriguez
(74) Attorney, Agent, or Firm—Richard A. Ryan

(57) ABSTRACT

A locking device for immobilizing trailers to prevent unauthorized movement or theft of the trailer by venting the compressed air that is used to release the brakes. The locking device has a controller unit, a control valve and power source mounted inside a housing. A control mechanism, such as a keypad or key lock system, is located outside of the housing, preferably on a trailer wall. The inlet on the control valve connects to the brake line that delivers compressed air to the trailer's compressed air-operated brakes. In the locked condition, the control valve is set so compressed air vents out the control valve's outlet, preventing release of the brakes. When the proper lock code, key or other signal is received, the control valve closes the outlet to stop the venting and allow the brakes to be released.

31 Claims, 4 Drawing Sheets

TRAILER LOCKING DEVICE

CROSS-REFERENCE TO RELATED APPLICATIONS

This application claims the benefit of U.S. Provisional Application No. 60/208,744 filed Jun. 2, 2000.

BACKGROUND OF THE INVENTION

A. Field of the Invention

The field of the present invention relates generally to devices for securing a trailer in place so as to prevent theft of the trailer. More specifically, this invention relates to devices for securing trailers by preventing movement of one or more of the trailer's wheels. Even more specifically, this invention relates to theft deterrent devices used to prevent unauthorized movement of a trailer by preventing air from reaching, and thereby releasing, the trailer's air brakes.

B. Background

Many persons utilize trailers for various applications, including trailers that are used to transport goods, vehicles, and other materials. Trailers commonly used in the trucking industry are very expensive. When used to transport certain expensive goods, such as electronics or cars, the content of the trailer can often far exceed the value of the trailer itself. However, while utilizing a trailer, the truck driver often needs to disconnect the trailer from the vehicle towing the trailer and leave the trailer at a specified location. All too often, unfortunately, thieves utilize the opportunity of a trailer left at a location, particularly if it is remote, to steal the trailer and its contents. Once the trailer is removed from its stored location and taken to a different location, the thieves are able to open the trailer and remove its contents. Due to the nature of the crime and the goods stored therein, it is often difficult for the owner to regain possession of his or her property, including the trailer itself.

Unauthorized movement or use, including theft, of trailers and their cargo is a major concern among those in the trucking industry (overall, loss of cargo has an estimated annual business impact of $30 to $60 billion). As security devices become more complicated and more expensive, thieves become more sophisticated and more resourceful, making protection of an unmanned trailer very difficult. While cars, trucks and other motorized vehicles require power control systems and steering mechanisms to operate, trailers generally have no such systems or mechanisms. As a result, it is generally easier to disable (i.e., make it difficult to move the vehicle without authorization) a motorized vehicle than it is to disable a non-motorized vehicle, such as a trailer, that relies on the movement of another vehicle for its own movement. The ability to hook-up to and move trailers makes it very difficult to disable them so as to prevent theft. Naturally, this makes it difficult and/or expensive to obtain insurance to protect against such losses.

While it is unlikely that any device can absolutely prevent theft of a vehicle or trailer in light of current technology and a determined thief, devices have been developed that, when properly used, deter the would be thief from stealing the vehicle, in part because of the amount of time and effort it takes to remove or get around the theft deterrent device. An example of devices that have been highly successful at accomplishing this objective are the various steering wheel lock devices that provide a bar across the steering wheel, making rotational movement of the steering wheel, and hence sustained movement of the vehicle, virtually impossible. While the steering wheel lock devices have worked well for self-propelled vehicles such as automobiles and trucks, there exists a need for a device that is specifically designed to allow the owner or driver of a trailer to leave the trailer in a designated location and prevent unauthorized movement of the trailer in order to protect the owner's investment in the trailer and the goods stored therein.

To prevent theft of a trailer left or stored at a protected or unprotected location, trailer owners typically use mechanical locking devices, such as the gladhand and kingpin locks, that are designed to physically prevent hook-up to those trailer components. As those in the trucking industry know, experience has proven that these devices can be overcome relatively easily by the determined and resourceful thief. In addition, the devices are useless if the truck driver forgets to set the locks. Even when the driver does set the locks, problems can arise if the next authorized driver does not have the key and is forced to break the lock to move the trailer, thereby rendering the security system useless. In order to be able to locate a stolen truck, and thereby also serving as a theft deterrent, some trucking companies utilize satellite tracking devices attached to the trailer that enable the trucking company or law enforcement personnel to track the movement of the trailer. Unfortunately, satellite systems are very expensive and can be relatively easily disabled (i.e., with a screwdriver and hammer) due to the vulnerability of the antenna assembly.

Because trailers utilize compressed air-operated braking systems, theft deterrent devices have been developed that take advantage of that system. The typical trailer utilizes spring-biased parking brakes which require the introduction of air pressure to release the brakes. The parking brake system is configured such that the brakes are engaged by a spring to lock the trailer's wheels when there is no air pressure in the air line to release the brakes. The tractor or truck used to haul the trailer includes an air compressor that provides compressed air to the trailer through a brake air line in order to release the brakes so as to allow movement of the trailer. When the driver releases the trailer from the truck, the disconnect of the brake air line from the compressor biases the spring to lock the wheels to prevent movement of the trailer.

Two such systems are described in U.S. Pat. No. 4,621,874 to Gustafsson and U.S. Pat. No. 5,145,240 to Harless, et al. The Gustafsson patent describes a vehicle theft device that utilizes a series of three-way valves and check valves to interact with the main and parking brake systems to prevent movement of a vehicle, primarily the tractor portion of a truck. The valves direct air pressure away from the drive axles and routes it to acuate the front brakes only. A major limitation with this type of device is that if there is a malfunction, then the front wheels can lock-up while the vehicle (and trailer) is moving. Vehicle accidents have resulted from such a malfunction. The Harless patent describes a valve assembly that interacts with a trailer's air brake system to prevent movement of the trailer until someone manually releases the valve from inside the trailer. This system is primarily designed to prevent injury to workers while loading the trailer.

Although the various theft deterrent devices currently available have some ability to prevent theft of trailers, they have disadvantages and limitations that prevent wide acceptance or effective theft deterrence. What is needed, is an easy to use and effective theft deterrent device that allows a trailer owner to quickly and securely lock his or her trailer in place in order to prevent unauthorized movement of the trailer.

SUMMARY OF THE INVENTION

The trailer locking device of the present invention solves the problems identified above. That is to say, the present invention discloses a new and useful trailer locking device that effectively prevents theft of a trailer. The trailer locking device of the present invention is adaptable to new and existing trailers, is easy for the truck driver to engage and is difficult for the thief to overcome or disable.

In one embodiment, the trailer locking device of the present invention is a separate unit having a housing, a controller unit mounted in the housing, a control valve mounted in the housing and a control mechanism located outside the housing. The controller unit is connected to a power supply, such as a battery, which can be located in the housing and adapted for connection to an external power source, such as the electrical take-off from the tractor or truck pulling the trailer. A charging regulator can be used to ensure the battery is kept in a charged condition without overcharging. The control valve is electrically connected to the controller unit. The control valve inlet is configured for connection to a supply of compressed air and the outlet is in fluid communication, selectively, with the inlet so as to allow compressed air to vent from the control valve. The compressed air can vent to the inside of the housing or outside the housing. In the preferred embodiment, the control valve has a mechanism for activating the valve by selectively opening and closing the interior chamber between the inlet and the outlet. The activating mechanism can be an electric motor operatively connected to a shaft that is slidably disposed in the control valve. One or more limiting switches, electrically connected to the controller unit, are used to monitor and limit the movement of the shaft in the control valve. Pressure sensors are operatively engaged with the control valve and electrically connected to the controller unit. The control mechanism, which can be a keypad, keylock, radio controlled or other similar mechanisms, is electrically connected to the controller unit for selectively controlling the control valve.

In another configuration of the present invention, the trailer locking device is configured for use with a trailer having an internal cavity and a brake line connected to one or more compressed air-operated brakes. This locking device has a housing which is disposed in the internal cavity of the trailer, a controller unit mounted in the housing, a control valve mounted in the housing and a control mechanism (i.e., keypad, key lock, etc.) on the outside of the housing. The controller unit is connected to a power supply, which is preferably located inside the housing, and the control valve is electrically connected to the controller unit. The control valve inlet is pneumatically connected to the brake line between the supply of compressed air (i.e., from the tractor or truck) and the brakes. The control valve outlet is in fluid communication with the inlet so as to allow the compressed air to vent from the control valve to place the brakes in a locked condition when desired. The control mechanism is operatively connected to the controller unit for selectively controlling the control valve so as to change the condition of the control valve from the locked to the unlocked condition. Preferably, the control mechanism is located outside of the housing and attached to an outer wall of the internal cavity. Alternatively, the control mechanism can be radio controlled with the receiver in or near the housing to receive transmissions from other sources to lock or unlock the trailer.

In yet another configuration of the present invention, the trailer lock device is incorporated into a trailer having a brake line pneumatically connected to one or more compressed air-operated brakes. In this configuration, the housing could be eliminated if the controller unit, power supply and control valve are incorporated into the trailer itself. As with the other embodiments, the control valve is electrically connected to the controller unit and it has an inlet that is pneumatically connected to the brake line between a supply of compressed air and the brakes. The control valve outlet is in fluid communication with the inlet so as to allow compressed air to vent from the control valve to place the brakes in a locked condition. The control mechanism is operatively connected (i.e., by coaxial cable, other wiring, radio connection or etc.) to the controller unit for selectively controlling the control valve so as to change between the locked condition and an unlocked condition. The control valve can have an activating mechanism for activating the control valve by selectively opening and closing the communication between the inlet and the outlet. The activating mechanism can comprise an electric motor that is operatively connected to a shaft which is slidably disposed in the control valve. One or more limiting switches can be used to monitor and limit the amount of movement of the shaft in the control valve. Pressure sensors are operatively engaged in the control valve to signal the controller unit to vent air through the control valve.

Accordingly, the primary objective of the present invention is to overcome the disadvantages associated with presently available trailer theft deterrent devices and to provide a trailer theft deterrent system that is easy to use and effective to prevent theft of a trailer. It is also an important objective of the present invention to provide a trailer locking device that prevents compressed air from getting to the air-operated brakes by utilizing a valve disposed between the source of compressed air and the brakes to vent the compressed air when locking of the trailer is desired. It is also an important objective of the present invention to provide a trailer lock device having a controller unit and control valve mounted in a housing with an external control mechanism to allow the user to lock and unlock the device. It is also an important objective of the present invention to utilize one or more pressure sensors connected to a controller unit to determine when to lock the trailer's brakes by venting air through the control valve. It is also an objective of the present invention to utilize the interior cavity places on a trailer to position the trailer locking device so as to make it more difficult to overcome the theft deterrent aspects thereof. The above and other objectives of the present invention will be explained in greater detail by reference to the attached figures and the description of the preferred embodiment which follows.

BRIEF DESCRIPTION OF THE DRAWINGS

In the drawings which illustrate the best modes presently contemplated for carrying out the present invention.

DETAILED DESCRIPTION OF THE PREFERRED EMBODIMENTS

Figure 1:
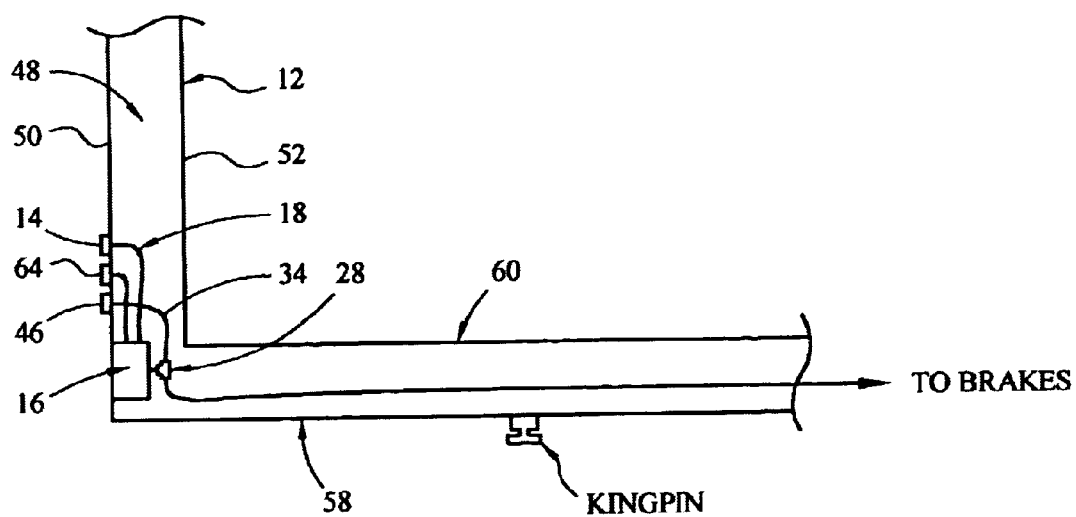
FIG. 1 is a cut-away side view of a typical trailer showing installation of the present invention.
Figure 2:
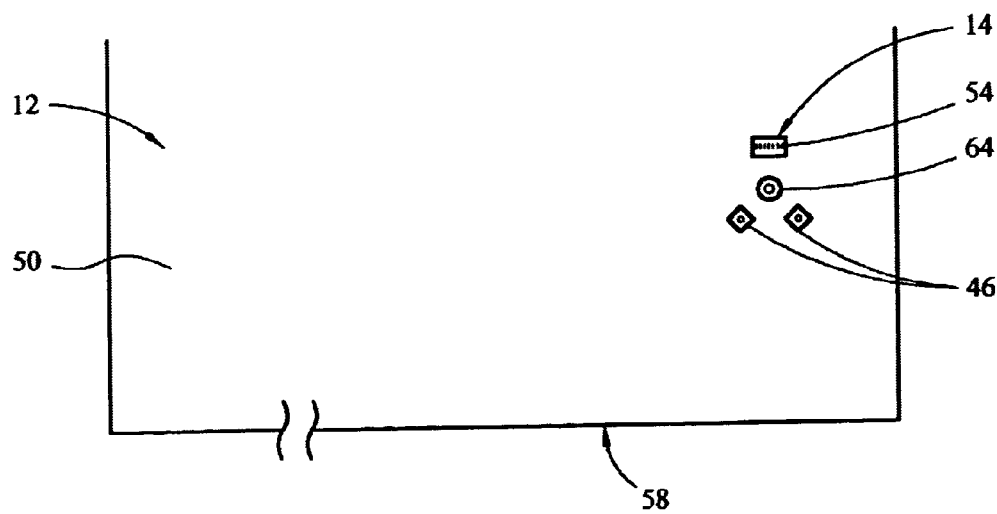
FIG. 2 is a front view of the trailer in FIG. 1.
Figure 3:
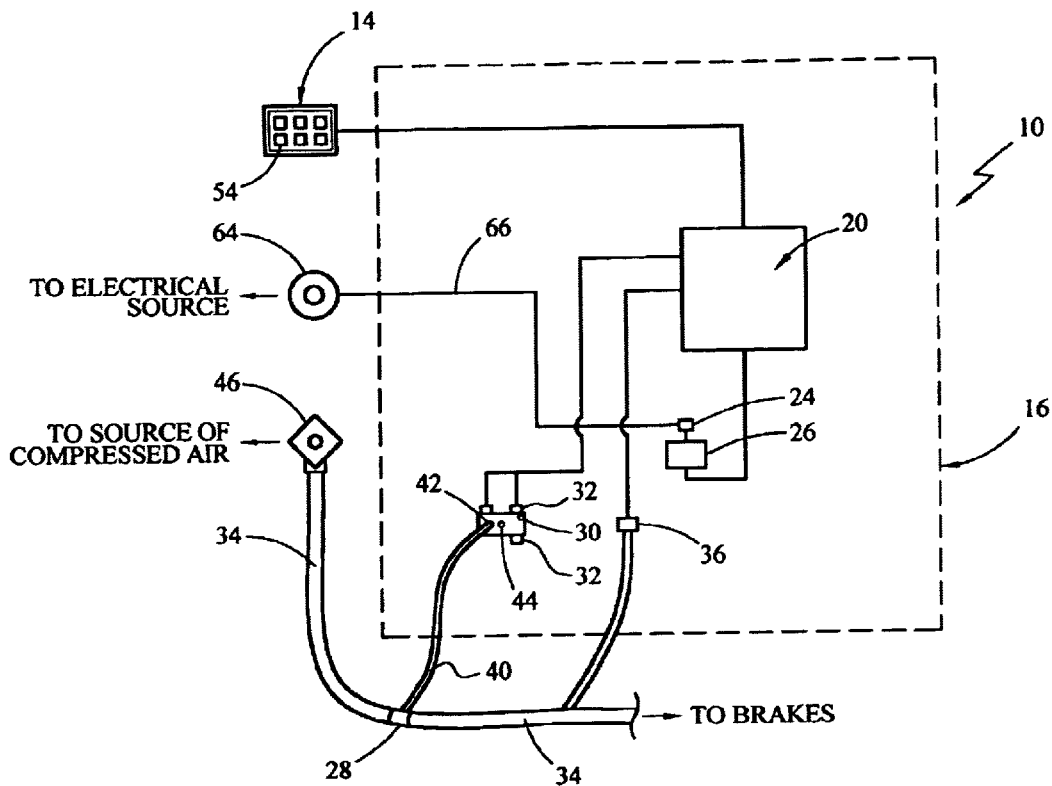
FIG. 3 is a schematic view of the components of the present invention.
Figure 4:
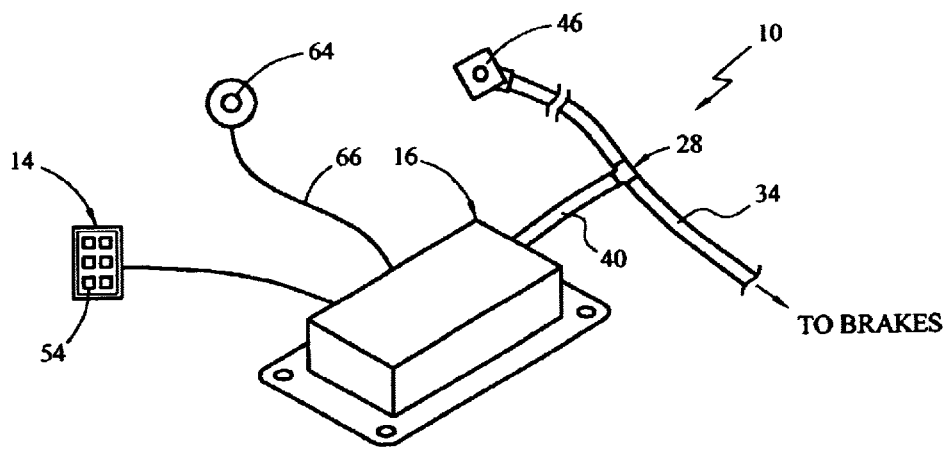
FIG. 4 is an perspective view of the preferred embodiment of the present invention.

With reference to the figures where like elements have been given like numerical designations to facilitate the reader's understanding of the present invention, and particularly with reference to the embodiments of the present invention illustrated in the attached figures, the preferred embodiments of the present invention are set forth below. In the preferred embodiments of the present invention, shown in FIGS. 1 through 4, the trailer locking device, designated generally as 10, is used in conjunction with a trailer 12 to prevent unauthorized movement of trailer 12. In the preferred embodiment, as best shown in FIG. 4, device 10 generally comprises a control mechanism 14 connected to housing 16. The housing 16 can be made out of a variety of materials and, in the preferred embodiment, should have one or more vent holes or be otherwise sufficiently vented to vent discharge air (as described below). In the preferred embodiment, control mechanism 14 is an electronic keypad mounted on and accessible from the outside of trailer 12, as shown in FIG. 1 (as also shown in FIG. 1 and set forth in more detail below, housing 16 is located inside the wall of trailer 12). Control mechanism 14 can also be a padlock dial type lock, key lock, radio controlled lock and card swipe type of lock. Cable 18, such as coaxial cable, interconnects keypad 14 with housing 16. As shown in the schematic of FIG. 3, inside housing 16 is a controller unit 20 having microprocessor board and associated electronic circuitry, charging regulator 24, power supply 26 (i.e., battery), control valve 30 and one or more pressure or pneumatic sensors 32. Radio and electrostatic interference protection should be designed into controller unit 20 according to automotive safety standards. As described in more detail below, control valve 30 can be a solenoid actuated latching dump valve.

As best shown in FIG. 3, also connected to control valve 30 through housing 16 is an inlet hose 40, which connects at one end to T-splice 28 disposed in pressure brake line 34. The other end of inlet hose 40 connects to the inlet 42 of control valve 30. Also on control valve 30 is one or more outlets 44 for venting compressed air from control valve 30 to maintain the brakes in a locked condition (as explained in more detail below). In one configuration, outlet 44 vent air to the inside of housing 16 where the air can pass outside the housing through the vent holes or other venting mechanism. In another configuration, a discharge hose can be used to connect outlet 44 with the exterior of housing 16 or the exterior of trailer 12. Brake line 34 interconnects gladhand coupler 46, located on the outside of trailer 12 and configured to received compressed air from the truck or tractor used to haul trailer 12, and the trailer's braking system (not specifically shown). One or more sensors 32 are operatively connected to control valve 30 and electronically connected to controller unit 20 to indicate whether there is compressed air in brake line 34 (and, therefore, inlet hose 40). If any one of the sensors 32 determines that the pressure in brake line 34 is greater than a predetermined level (i.e., 60 psi, which is a typical minimum level needed to activate trailer brakes), then controller unit 20 will not open control valve 30, will not vent air through outlet 44 and, therefore, will not lock the trailer's brakes. This is a safety feature to prevent accidental locking of the trailer's brakes while the truck/trailer is moving. The sensors 32 are also used to automatically lock the trailer's brakes. Once the sensors 32 indicate to the controller unit 20 that the pressure in the brake line 34 has dropped below the predetermined level (such as when the driver stops the truck or disconnects the air supply), then the controller unit 20 signals control valve 30 to open and allow air to be vented through the outlet 44, thereby preventing the trailer's brakes from being unlocked. If desired, a second sensor 36 can also be used to determine if compressed air is flowing in line 34 beyond T-splice 28 to the brake system. In one embodiment of the present invention 10, housing 16 is sealed at the manufacturing stage to prevent unauthorized tampering and to prevent water, salt and other material from entering the components inside housing 16. The various components that are located inside housing 16 should be mounted therein to prevent unwanted movement of the components during transit of trailer 12.

As shown in FIG. 1, housing 16 is best located inside the structural components of trailer 12 where it is inaccessible to a thief and protected from the environment. Many trailers 12 are constructed to have interior cavity 48 between the outer wall 50 and inner bulkhead 52. For these trailers 12, housing 16 is installed in cavity 48 and control mechanism 14 is installed such that it faces outward from outer wall 50 so the keys 54 (for the keypad versions of control mechanism 14) can be accessed by the truck driver or other person needing to move trailer 12. Brake air lines 34, which connect to T-splice 28, are located between the deck plate 58 and the floor 60 of trailer 12 and travel rearward to connect to the trailer's brakes. In the configuration described above, housing 16 can be installed in cavity 48 by cutting an opening in deck plate 58 with a disk grinder or similar tool and then sealing the opening by welding or other processes. Once installed, it would be very difficult for a thief to access housing 16 because use of a cutting torch or like equipment would likely result in cutting the brake lines 34 or inlet hose 40, which would disable the brake system altogether.

Figure 5:
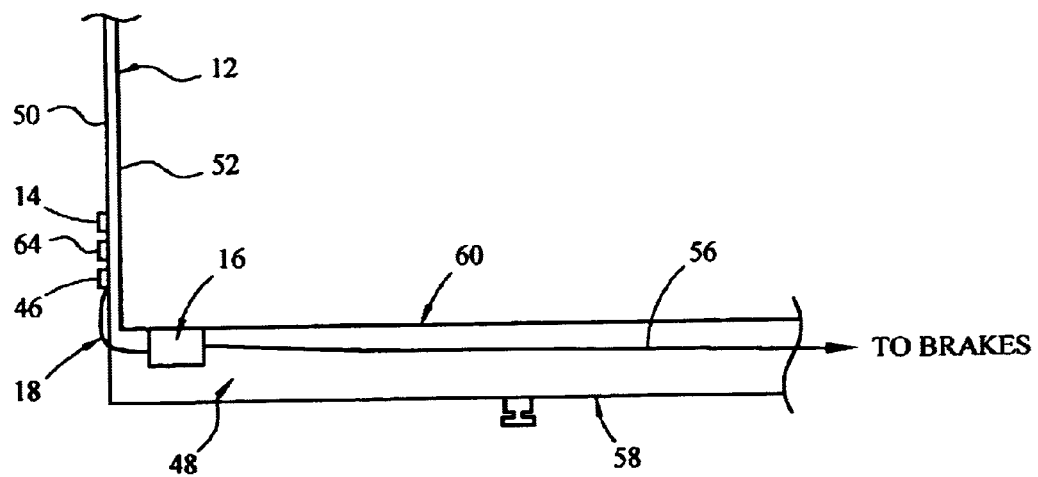
FIG. 5 is a cut-away side view showing use of the invention with a trailer not having cavity between the outside and the interior bulkhead.
Figure 6:
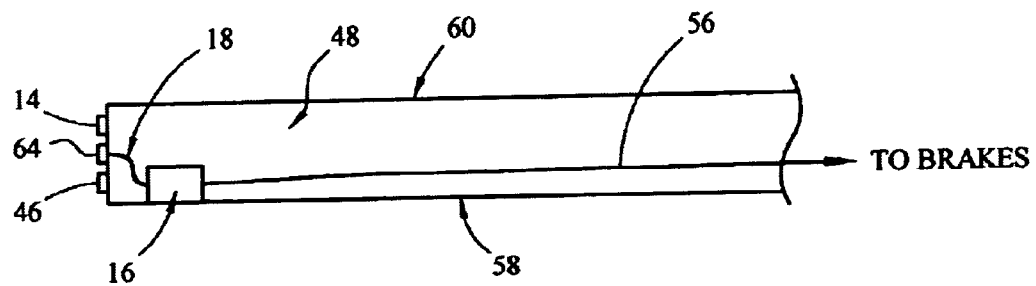
FIG. 6 is a cut-away side view showing use of the present invention with a flatbed trailer.

As shown in FIG. 5, for those trailers which are constructed such that they do not have cavity 48 at the front of the trailer 12, such as dry vans with no inner bulkhead and refrigerated trucks with externally mounted air lines, housing 16 can be installed in the interior cavity 48 between deck plate 58 and floor 60, with cable 18 located on the outside of outer wall 50. As shown in FIG. 6, flatbed trailers and the like will likely require the housing 16 to be installed in cavity 48 between deck plate 58 and floor 60 with cable 18 connecting to control mechanism 14 (i.e., keypad).

As shown in FIG. 3 and explained below, control mechanism 14 connects directly to controller unit 20 such that the proper numerical entry on keys 54 will unlock device 10 (by closing control valve 30) and allow trailer 12 to be moved. Electrical communication between keypad 14 and controller unit 20 is coded such that is not possible to "hot wire" the system, even if the potential thief can access the wires from control mechanism 14. Power coupling 64, which connects to the external electrical source (such as the power supply system on the truck or tractor), delivers power to charging regulator 24, via power supply line 66, to maintain battery 26 in a charged condition. Power from battery 26 operates device 10. Alternatively, for those trailers 12 that have their own power source (such as refrigerated trucks), power supply line 66 can connect to the trailer's power source. In this and similar configurations, it may be possible to eliminate battery 26. The air line 34 from gladhand coupler 46 connects to T-splice 28, which branches off to inlet hose 40, to deliver compressed air to valve 30 and to the air brakes on trailer 12. Sensor 32 connects to controller unit 20 so that the microprocessor therein can determine if coupler 46 is connected to the compressed air system of the truck or tractor. If the controller unit 20 receives a signal from sensor 32 that the compressed air supply line is not connected, it will open control valve 30 or lock it in an open position to prevent compressed air from being delivered to the brakes, thereby preventing movement of trailer 12.

In use, once trailer 12 is stopped and placed in a location where it is desired to be left until the next use, the driver sets the trailer's brakes, causing a drop in the air pressure in brake line 34. In the preferred embodiment of the present invention, the pressure sensors 32 constantly measure, with controller unit 20, the pressure in the brake line 34 to determine a measured pressure amount. When the measured pressure in brake line 34 drops below the predetermined pressure amount, the controller unit 20 signals the control valve 30 to open so that air will be vented through outlet 44, thereby automatically placing the trailer locking device 10 in a locked condition and preventing any movement of trailer 12 until the device 10 is placed in an unlocked condition. If someone without authorization attempts to hook-up to trailer 12, any compressed air delivered to brake line 34 will follow the path of least resistance and be vented out control valve 30 through outlet 44. The automatic locking by device 10 can be subject to any delay time (i.e., not automatically lock for 30 minutes to allow for a restroom or lunch break). In this manner, the operation of device 10 is not dependent on the truck driver remembering to set the controller mechanism 14 lock (code, key or etc.) after he or she disconnects from trailer 12. Alternatively, device 10 can be configured to require the driver or owner to manually operate the control mechanism 14 to place the trailer locking device 10 in a locked condition. For instance, with a keypad system, a lock code would be entered on keys 54 of the keypad control mechanism 14 to send a signal to microprocessor 20 to open valve 30. As with the preferred automatic system, once in the locked condition, any compressed air that comes into the system (i.e., from an unauthorized hook-up) will be vented through outlet 44, preventing the air from passing through to the air brakes to unlock the trailer's brakes. When it is desired to move trailer 12, the truck driver can be provided with the proper code, key or etc. so that he or she may deactivate the trailer locking device 10. For key pad systems, there should be a sufficient number of keys 54 to prevent successful random guessing of numbers and not too many as to require the memorization of a complicated sequence of numbers. When the proper code is entered, the controller unit 20 sends a close signal to control valve 30 to close outlet 44, which allows compressed air to flow to the brakes, thereby releasing the brakes and allowing trailer 12 to be moved. To assist use at night and in inclement weather, the keypad or other device on controller unit 14 should be illuminated so that it can be seen and any operational or status indicators on controller unit 14 can be read.

Figure 7:
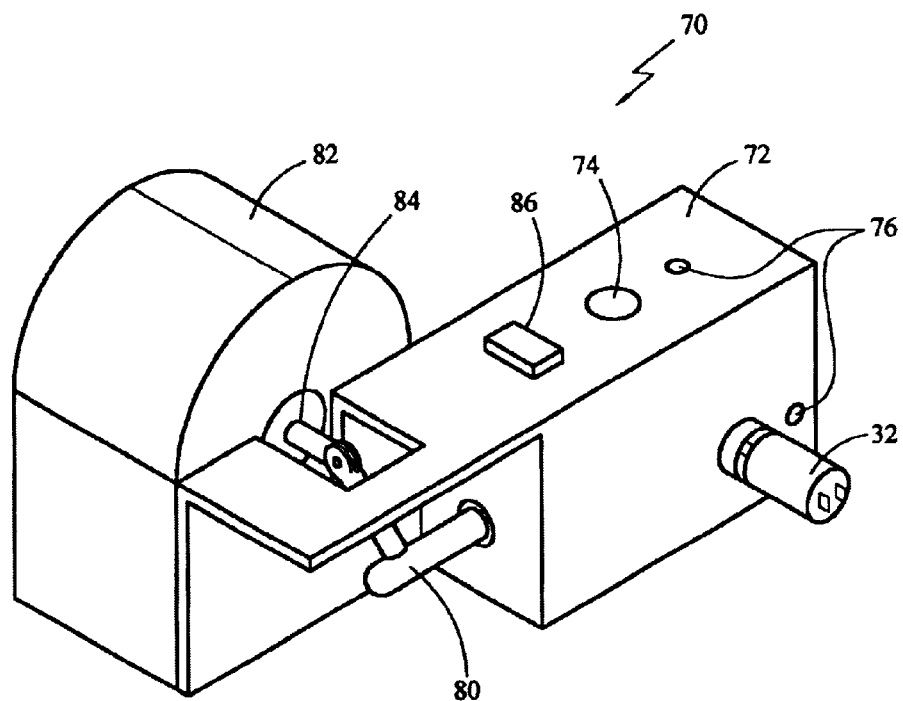
FIG. 7 is a perspective view of a control valve preferably suitable for use with the present invention.
Figure 8:
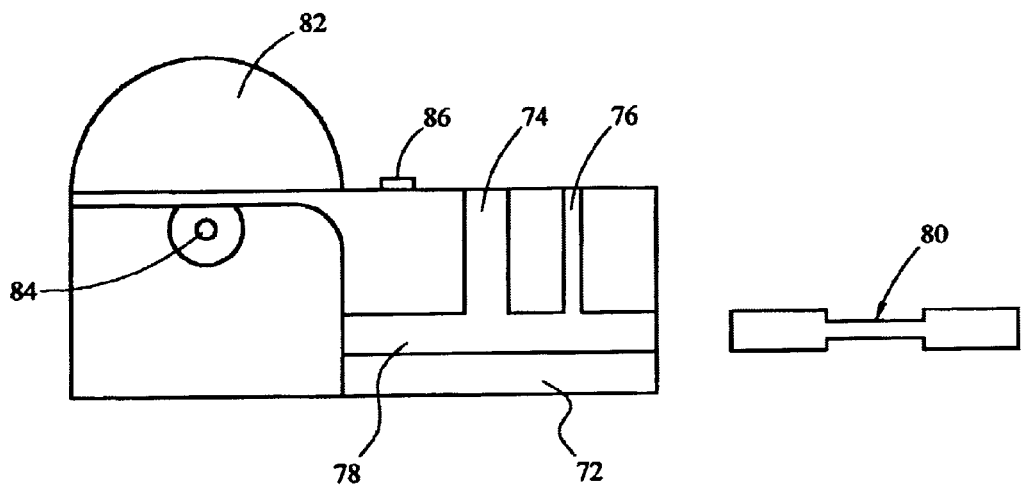
FIG. 8 is a cross-sectional view of the control valve in FIG. 7.

A number of different valves could be suitable for use as control valve 30. One particular control valve 30 that has been found to be particularly suitable for use with the present invention is shown in FIGS. 7 and 8 and is identified as 70 therein. Control valve 70 has valve body 72 with inlet 74, outlets 76 and interior chamber 78. Inlet 74 is configured to attach to inlet hose 40, which connects to brake line 34, and connect to chamber 78. Outlets 76 are in fluid communication with inlet 74 by way of chamber 78 so as to vent compressed air from valve 70 to prevent the trailer brakes from being released. Chamber 78 is configured to slidably receive shaft 80 therein. An activating mechanism, such as electric motor 82 is attached to valve 70 to move shaft 80 in chamber 78. Motor shaft 84 connects to an end of shaft 80 to slide shaft 80 in chamber 78. As the shaft 80 slides in chamber 78, the inlet 74 and outlets 76 are alternatively moved from being in communication with each other to where there is no communication between inlet 74 and outlets 76. Pressure sensors 32 attached to valve body 72 are used to monitor the pressure inside chamber 78. For back-up purposes, multiple pressure sensors 32 can be used (i.e., two are shown in FIG. 3.). To monitor and limit the movement of shaft 80 inside chamber 78, one or more limiting switches 86 can be mounted on valve body 72 and connected to shaft 80.

The use of a microprocessor in controller unit 20 allows user-specific requirements to be programmed into device 10 to make the device more functional for the particular driver or trucking company using device 10. For instance, microprocessor 20 can be programmed to allow entry of a delay time or time function that locks the brakes for a specific amount of time (i.e., 8 hours) or automatically unlocks the brakes at a specific time of day and/or date (i.e., 7:00 a.m. on Monday morning). Microprocessor 20 can also be programmed to recognize different codes from different drivers so the trucking company can verify who has moved trailer 12 (and even when). For instance, device 10 can have a three tier code system where the driver's code and the amount of delay time can be modified only be a person having a management code, which code can only be modified by someone having the executive or top-level code. The factory can set the executive code, allowing the purchaser to set and modify the management and driver codes.

As discussed above, device 10 can utilize a mechanical locking system, such as a key lock, instead of the electronic keypad 14. The use of a key lock system reduces the dependence on electronics and the amount of electricity (battery) power required to operate device 10. In addition, the use of a key to unlock device 10 allows the trucking company or driver to control who can unlock device 10 (i.e., only a person with a key). As discussed above, however, the use of a key lock does have several disadvantages with regard to how easy it is to have a second driver unlock device 10 after the first driver sets device 10 in a locked condition. Another alternative control mechanism 14 is the use of a radio receiver located in the housing 16 or in connection with controller unit 20 that can receive a radio transmission from a central location or from the truck or tractor pulling trailer 12. Various other control mechanisms 14 can be used. In addition, various control mechanisms 14 can be combined (i.e., keypad, key lock and radio transmission) so as to provide increased security, redundancy or the ability to have a master override.

In another embodiment of the trailer locking device 10 of the present invention, the device 10 can be incorporated into a trailer 12 without the use of any housing 16. When the trailer 12 is made, the controller unit 20, control valve 30 and power supply (battery 26) can be incorporated directly into the trailer 12, such as in an interior cavity 48. These components would have to be mounted to one or more of trailer walls. This eliminates the need for a separate housing 16 component. The control mechanism 14, such as keypad, could be mounted on the outside of the trailer wall and connect directly to controller unit 20, as described above. The control valve 30 and other components would operate the same as described above. In order for this embodiment to be practical, the various components would have to be sealed inside the trailer 12 and mounted so as not to break loose during movement of trailer 12.

While there are shown and described herein certain specific alternative forms of the invention, it will be readily apparent to those skilled in the art that the invention is not so limited, but is susceptible to various modifications and rearrangements in design and materials without departing from the spirit and scope of the invention. In particular, it should be noted that the present invention is subject to modification with regard to the dimensional relationships set forth herein and modifications in assembly, materials, size, shape, and use. For instance, there are numerous components described herein that can be replaced with equivalent functioning components to accomplish the objectives of the present invention. The present invention resides in the novel features of form, construction, mode of operation and combination of elements presently described and understood by the claims.

What is claimed is:

1. A trailer locking device for use with a trailer having a brake line configured to pneumatically interconnect a supply of compressed air to one or more air-operated brakes on said trailer, said trailer locking device comprising:

a controller unit connected to a power supply;

a control valve electronically connected to said controller unit, said control valve having an inlet and an outlet selectively in fluid communication with said inlet, said inlet pneumatically connected to a brake line outlet pneumatically disposed in said brake line between said supply of compressed air and said brakes, said control valve configured to open in response to an open signal from said controller unit so as to allow compressed air from said brake line to vent from said outlet and maintain said brakes in a locked condition until a close signal is received from said controller unit to close said control valve so as to prevent compressed air from venting through said outlet and place said brakes in an unlocked condition; and control means operatively connected to said controller unit for selectively controlling said control valve.

2. The trailer locking device of claim 1, wherein said control valve further comprises an electric motor operatively connected to a shaft slidably disposed in said control valve to selectively open and close the communication between said inlet and said outlet and one or more limiting switches to monitor and limit the movement of said shaft in said control valve.

3. The trailer locking device of claim 2, wherein said one or more limiting switches is electrically connected to said controller unit.

4. The trailer locking device of claim 2, wherein said control valve further comprises one or more pressure sensors operatively engaged with said control valve electronically connected to said controller unit so as to measure the air pressure at said control valve, at least one of said pressure sensors configured to communicate with said controller unit to open said control valve when the pressure in said brake line drops below a pre-determined level and to maintain said control valve in a closed condition when the pressure in said brake line is above said pre-determined level.

5. The trailer locking device of claim 4, wherein at least one of said one or more pressure sensors measure the pressure inside said control valve between said inlet and said outlet.

6. The trailer locking device of claim 1, wherein said control valve further comprises one or more pressure sensors operatively engaged with said control valve, said one or more pressure sensors electronically connected to said controller unit so as to measure the air pressure at said control valve, at least one of said pressure sensors configured to communicate with said controller unit to open said control valve when the pressure in said brake line drops below a pre-determined level and to maintain said control valve in a closed condition when the pressure in said brake line is above said pre-determined level.

7. The trailer locking device of claim 6, wherein at least one of said one or more pressure sensors measure the pressure inside said control valve between said inlet and said outlet.

8. The trailer locking device of claim 1, wherein said control means comprises a keypad entry system.

9. The trailer locking device of claim 1, wherein said control means comprises a key lock system.

10. The trailer locking device of claim 1, wherein said power supply is a battery disposed inside of a housing, said battery operatively connected to an external electrical source and means for changing said battery.

11. The trailer locking device of claim 1, wherein said control valve further comprises an electric motor operatively connected to a shaft slidably disposed in said control valve to selectively open and close the communication between said inlet and said outlet and one or more limiting switches to monitor and limit the movement of said shaft in said control valve.

12. The trailer locking device of claim 1, wherein said controller unit has a multiple tier code system for allowing modification of one or more controls of said controller unit.

13. The trailer locking device of claim 1, wherein said controller unit can be programmed with one or more time settings.

14. The trailer locking device of claim 13, wherein said controller unit has a multiple tier code system for allowing modification of one or more controls of said controller unit.

15. A trailer locking device for use with a trailer having an internal cavity and a brake line connected to one or more compressed air-operated brakes, comprising:

a housing disposed in said internal cavity of said trailer;

a controller unit in said housing, said controller unit connected to a power supply;

a control valve in said housing and electronically connected to said controller unit, said control valve having an inlet pneumatically connected to a brake line outlet disposed in said brake line between a supply of compressed air and said brakes, said control valve having an outlet selectively in fluid communication with said inlet, said control valve configured to open in response to an open signal from said controller unit so as to allow compressed air from said brake line to vent from said outlet and to maintain said brakes in a locked condition until a close signal is received from said controller unit to close said control valve so as to prevent compressed air from venting though said outlet and place said brakes in an unlocked condition; and control means operatively connected to said controller unit for selectively controlling said control valve so as to change between said locked condition and said unlocked condition, said control means located outside of said housing.

16. The trailer locking device of claim 15, wherein said control valve further comprises an electric motor operatively connected to a shaft slidably disposed in said control valve to selectively open and close the communication between said inlet and said outlet and one or more limiting switches to monitor and limit the movement haft in said control valve.

17. The trailer locking device of claim 15, wherein said control valve further comprises one or more pressure sensors operatively engaged with said control valve, said one or more pressure sensors electronically connected to said controller unit so as to measure the air pressure at said control valve, at least one of said pressure sensors configured to communicate with said controller unit to open said control valve when the pressure in said brake line drops below a pre-determined level and to maintain said control valve in a closed condition when the pressure in said brake line is above said pre-determined level.

18. The trailer locking device of claim 17, wherein at least one of said one or more pressure sensors measure the pressure inside said control valve between said inlet and said outlet.

19. The trailer locking device of claim 15, wherein said control means is disposed on a wall of said cavity external to said cavity.

20. The trailer locking device of claim 15, wherein said control means is a radio controlled device.

21. A trailer locking device for use in a trailer having a brake line configured to pneumatically interconnect a supply of compressed air to one or more air-operated brakes, said trailer locking device comprising:

a controller unit connected to a power supply;

a control valve electronically connected to said controller unit, said control valve having an inlet and an outlet selectively in fluid communication with said inlet, said inlet pneumatically connected to a brake line outlet pneumatically disposed in said brake line between said supply of compressed air and said brakes, said control valve configured to open in response to an open signal from said controller unit so as to allow compressed air from said brake line to vent from said outlet and maintain said brakes in a locked condition until a close signal is received from said controller unit to close said control valve so as to prevent compressed air from venting through said outlet and place said brakes in an unlocked condition;

one or more pressure sensors operatively engaged with said control valve, said one or more pressure sensors electronically connected to said controller unit so as to measure the air pressure at said control valve, at least one of said pressure sensors configured to communicate with said controller unit to open said control valve when the pressure in said brake line drops below a pre-determined level and to maintain said control valve in a closed condition when the pressure in said brake line is above said pre-determined level; and control means operatively connected to said controller unit for selectively controlling said control valve so as to change between said locked condition and said unlocked condition.

22. The trailer locking device of claim 21, wherein said controller unit and said control valve are disposed in a housing.

23. The trailer locking device of claim 22, wherein said housing is located in an internal cavity of said trailer.

24. The trailer locking device of claim 21, wherein at least one of said one or more pressure sensors measure the pressure inside said control valve between said inlet and said outlet.

25. The trailer locking device of claim 21, wherein at least one of said one or more pressure sensors measure the pressure inside said control valve between said inlet and said outlet.

26. A method of operating a trailer locking device for locking the brakes of a trailer having a brake line configured to pneumatically interconnect a supply of compressed air to one or more air-operated brakes on said trailer, comprising the steps of:

a. intercepting the pressure in said brake line at a brake line output disposed between said source of compressed air and said air brakes;

b. delivering the pressure in said brake line to a control valve having an inlet and an outlet;

c. measuring the pressure in said brake line with one or more pressure sensors operatively engaged with said control valve and electronically connected to a controller unit to obtain a measured pressure;

d. comparing said measured pressure to a pre-determined pressure amount;

e. transmitting an open signal from said controller unit to said control valve to open said control valve when said measured pressure is less than said pre-determined pressure; and f. venting air from said brake line through said outlet in said control valve to automatically place said brakes in a locked condition.

27. The method of claim 26, wherein air is vented from said brake line until said control valve receives a close signal from said, controller unit.

28. The method of claim 27 further comprising the step of closing said outlet so as to allow air from said brake line to place said brakes in an unlocked condition.

29. The method of claim 26, wherein at least one of said one or more pressure sensors measure the pressure inside said control valve between said inlet and said outlet.

30. A method of locking the brakes of a trailer having a brake line pneumatically interconnect a supply of compressed air to one or more air-operated brakes on said trailer, comprising the steps of:

a. intercepting the pressure in said brake line at a brake line output disposed between said source of compressed air and said air brakes;

b. delivering the pressure in said brake line to a control valve having an inlet and an outlet;

c. measuring the pressure in said brake line with one or more pressure sensors operatively engaged with said control valve and electronically connected to a controller unit to obtain a measured pressure, at least one of said one or more pressure sensors measuring the pressure inside said control valve between said inlet and said outlet;

d. comparing said measured pressure to a pre-determined pressure amount;

e. transmitting an open signal from said controller unit to said control valve to open said control valve when said measured pressure is less than said pre-determined pressure, said controller unit communication with said control valve configured to prevent opening of said control valve if said measured pressure is greater than said pre-determined pressure; and f. venting air from said brake line through said outlet in said control valve so as to automatically place said brakes in a locked condition, said controller unit configured to operate said control valve so as to vent air through said outlet until said controller unit receives a close signal from a control means operatively connected to said controller unit.

31. The method of claim 30 further comprising the step of closing said outlet so as to allow air from said brake line to place said brakes in an unlocked condition.

* * * * *